United States Patent [19]

Ainoura

[11] 4,111,098
[45] Sep. 5, 1978

[54] CARBIDE HOBBING MACHINE

[76] Inventor: Masato Ainoura, 1253 Eguchi, Kita-Shigeyasu-cho, Miyaki-gun, Saga-ken, Japan

[21] Appl. No.: 799,679

[22] Filed: May 23, 1977

[30] Foreign Application Priority Data

Mar. 8, 1977 [JP] Japan .................................. 52-25133

[51] Int. Cl.² .............................................. B23F 5/22
[52] U.S. Cl. .......................................... 90/4; 90/11 A
[58] Field of Search ........................ 90/4, 11 A, 20.5; 407/25

[56] References Cited

U.S. PATENT DOCUMENTS

| 3,740,808 | 6/1973 | Shioya | 407/25 |
|---|---|---|---|
| 4,009,636 | 3/1977 | Ainoura | 90/4 |

*Primary Examiner*—Gil Weidenfeld
*Attorney, Agent, or Firm*—George B. Oujevolk

[57] ABSTRACT

A carbide hobbing machine comprises a tool support member operably mounted on a machine frame and including a hob support shaft for supporting a carbide hob, a work piece support member operably mounted on the machine frame to support a work piece, a drive motor including a motor shaft mounted on the tool support member adjacently to the carbide hob and extending on the same axial line as that of the hob support shaft, and a coupling disposed between the motor shaft and the hob support shaft to directly drive the carbide hob, said coupling including a device for absorbing shocks and vibrations imposed on the carbide hob during the operation of hobbing the work piece.

3 Claims, 17 Drawing Figures

CARBIDE HOBBING MACHINE

BACKGROUND OF THE INVENTION (1) Field of the Invention

This invention relates to a carbide hobbing machine for hobbing steel-made gears. More particularly, the invention relates to an improvement in the driving system in such carbide hobbing machine.

(2) Description of the Prior Art

If steel-made gears can be hobbed at high speeds with a powerful single cutting by using a carbide hob, the efficiency of manufacturing gears will be remarkably increased and it will lead to great economical advantages. Therefore, various makers in the world have eagerly attempted to develop carbide hobbing machines and since around 1969, carbide hobbing machines have been exhibited in international trade fairs held in Europe. In these carbide hobbing machines, a play is provided in a driving system or a hydraulic bearing is adopted for a hob shaft so as to enable a high speed rotation of the hob shaft. In some machines, special means are adopted for preventing thermal deformation. However, these modifications are not essential improvements and these conventional carbide hobbing machines do not substantially rise above customary high speed hobbing machines. Accordingly, when a cutting edge of the carbide hob starts an operation of hobbing a work piece for a gear, a large shock is imposed on the cutting edge, and even during the hobbing operation, the cutting edge undergoes violent vibrations. Therefore, chipping is readily caused during the operation. Because of these defects, development of carbide hobbing machines only makes very slow progress.

OBJECTS OF THE INVENTION

It is a primary object of the present invention to provide a carbide hobbing machine in which a hob shaft is directly driven by a drive motor through a device for absorbing shocks and vibrations without provision of a gear transmission mechanism between the drive motor and the hob shaft, vibrations caused when a cutting edge of a carbide hob cuts into a work piece for a gear are moderated and steel-made gears can be hobbed at high speeds with a powerful single cutting without occurrence of chipping.

Another object of the present invention is to provide a carbide hobbing machine in which the efficiency of manufacturing gears can be remarkably increased and gears having a high precision can be made.

Other objects will be apparent from the following detailed description, and advantages of the present invention will be apparent to those skilled in the art when the present invention is worked.

SUMMARY OF THE INVENTION

In accordance with the present invention, the foregoing and other objects are attained by a carbide hobbing machine comprising a tool support member operably mounted on a machine frame and including a hob support shaft for supporting a carbide hob, a work piece support member operably mounted on the machine frame to support a work piece, a drive motor including a motor shaft mounted on the tool support member adjacently to the carbide hob and extending on the same axial line as that of the hob support shaft, and a coupling disposed between the motor shaft and the hob support shaft to directly drive the carbide hob, said coupling including means for absorbing shocks and vibrations imposed on the carbide hob during the operation of hobbing the work piece, said means having such properties that at the initial stage of hobbing the work piece by the carbide hob, said means is elastically deformed so as to allow torsion of the hob support shaft, with advance of the hobbing operation the rigidity of said means is increased so as to prevent the torsion of the hob support shaft from being enhanced beyond a certain level and at the time of completion of the hobbing operation said means is slowly restored to the original state while leaving a residual strain sufficient to eliminate gradually the torsion on the hob support shaft.

BRIEF DESCRIPTION OF THE DRAWING

FIG. 11-*a* and FIG. 11-*b* are diagrams illustrating the effects of damping vibrations by driven coupling members to which resilient members different in the constituting material are bonded, respectively.

FIGS. 15-*a* and 15-*b* are views illustrating cut lines of gears hobbed by the carbide hobbing machine provided with the conventional driving system and the carbide hobbing machine provided with the driving system of the present invention.

DETAILED DESCRIPTION OF THE PREFERRED EMBODIMENTS

The structure of the carbide hobbing machine of the present invention will now be described by reference to embodiments illustrated in the accompanying drawing.

Figure 1:
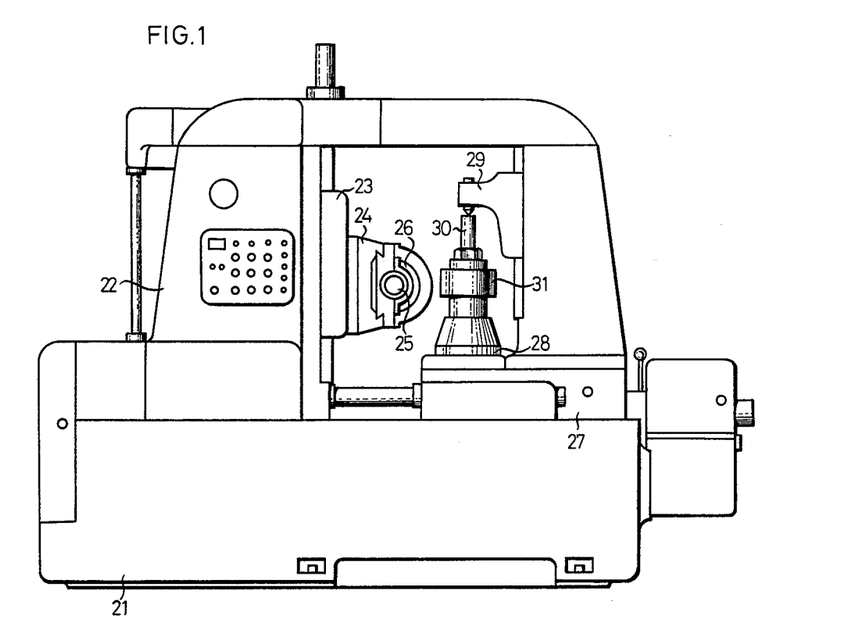
FIG. 1 is a front view of one embodiment of the carbide hobbing machine of the present invention.

Referring now to FIG. 1, a machine frame of the carbide hobbing machine is constituted by a bed 21 and a column 22. A tool support member, namely a hob head 24, is disposed on the inner surface of the column 22 through a hob saddle 23 so that the head 24 can be moved in the vertical direction and be turned. A hob shaft 25 is rotatably supported on the side portion of the hob head 24, and a hob 26 can be attached to the hob shaft 25. A work piece support member, namely a table 28, is disposed on the top face of the head 21 through a table saddle 27 so that the table 28 can be moved in the horizontal direction. A work piece support shaft 30 is vertically disposed between the table 28 and a supporting arm 29. A work piece, namely a gear-forming material 31, can be attached onto the support shaft 30.

Figure 2:
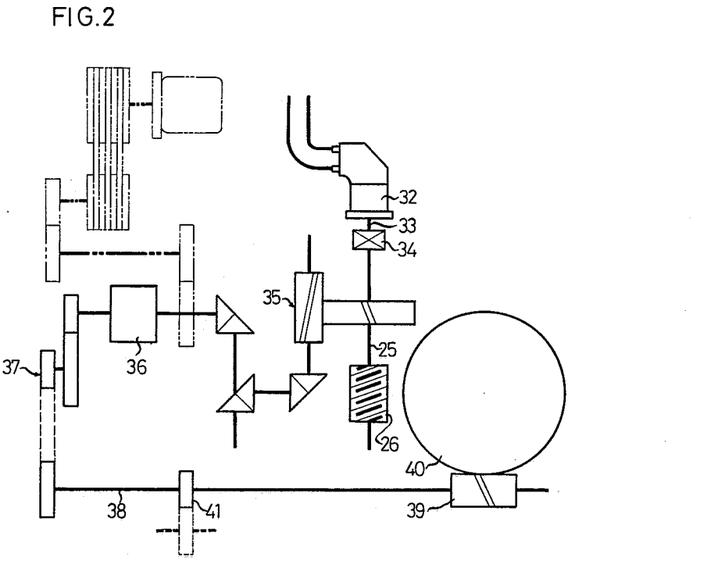
FIG. 2 is a view illustrating diagrammatically the driving system of the carbide hobbing machine shown in FIG. 1.
Figures 3, 7, 8:
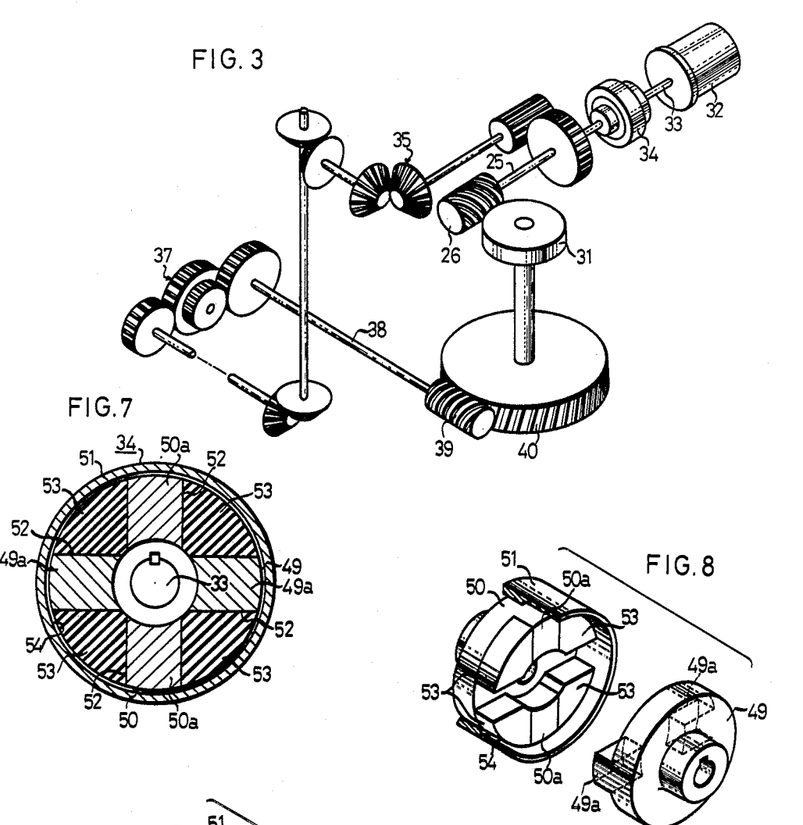
FIG. 3 is an enlarged perspective view showing main parts of the driving system.
FIG. 7 is an enlarged view showing the section taken along the line 7—7 in FIG. 4, which illustrates the coupling used in the carbide hobbing machine shown in FIG. 1.
FIG. 8 is a partially cut-out fragmentary perspective view illustrating the coupling, especially the driving coupling member, of FIG. 4 in the state separated from other members.

The driving system of the carbide hobbing machine of this embodiment differs from the driving system of the conventional carbide hobbing machine indicated by chain lines in FIG. 2 in the point that a gear transmission mechanism is not disposed between the driving source and the hob shaft 25, and as will be apparent from FIGS. 2 and 3, according to the present invention, a hydraulic motor 32 is disposed adjacently to the hob 26 and the hob shaft 25 is connected to a motor shaft 33 on the same axial line by a coupling 34, so that the hob 26 can be directly driven by the driving action of the hydraulic motor 32. An index change gear mechanism 37 is driven by the hob shaft 25 through a gear transmission mechanism 35 and a differential gear mechanism 36, and a master worm gear 40 is turned by the index change gear mechanism 37 through a master worm shaft 38 and a master worm 39, whereby the table 28 integrated with the master worm gear 40 and the gear material 31 attached to the table 28 are rotated. Further, a feed change gear mechanism (not shown) is driven by the master worm shaft 38 through a gear transmission mechanism 41, so that the hob head 24 is fed in the axial direction of the gear material 31 along the sliding face of the column 22 and the gear material 31 is cut by the hob 26.

The driving system for driving the hob 26 will now be described in detail by reference to FIGS. 4 to 9.

Figure 4:
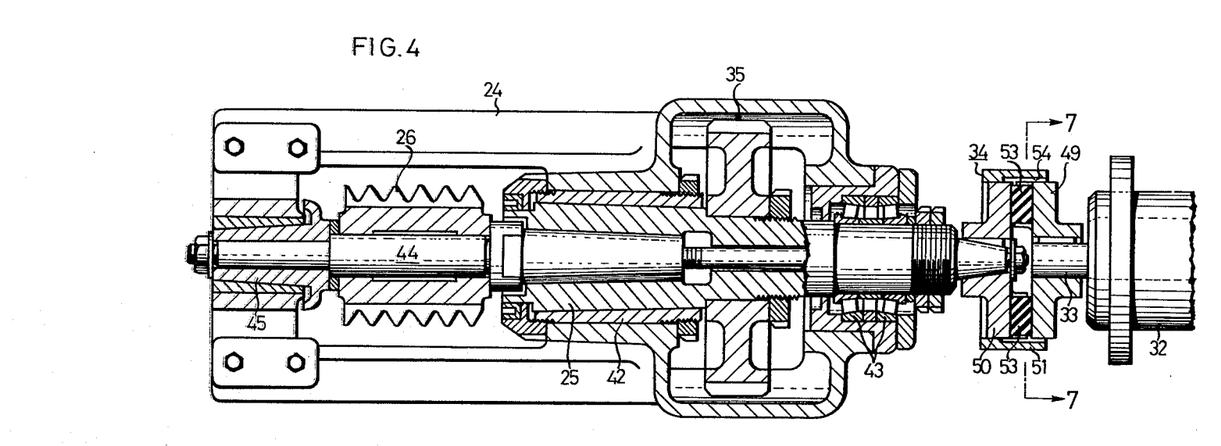
FIG. 4 is an enlarged sectional view illustrating the hob driving mechanism in the carbide hobbing machine shown in FIG. 1.
Figure 5:
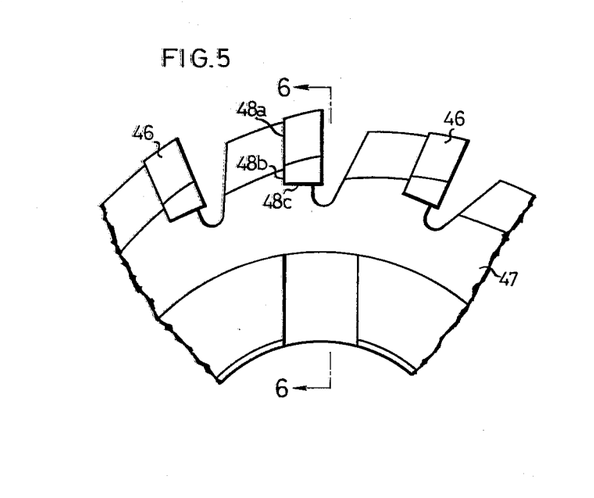
FIG. 5 is a side view showing the main part of one example of a hob provided with carbide blades, which is used for the carbide hobbing machine shown in FIG. 1.
Figure 6:
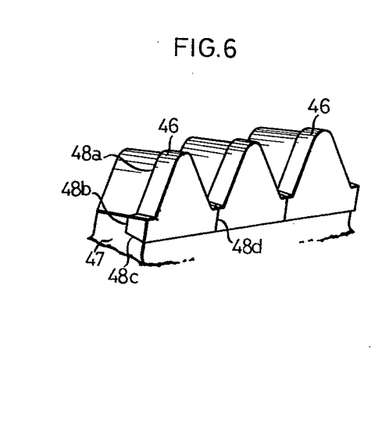
FIG. 6 is a perspective view, seen along the line 6—6 in a direction of an arrow in FIG. 5, of the main part of the hob provided with carbide blades.
Figure 9:
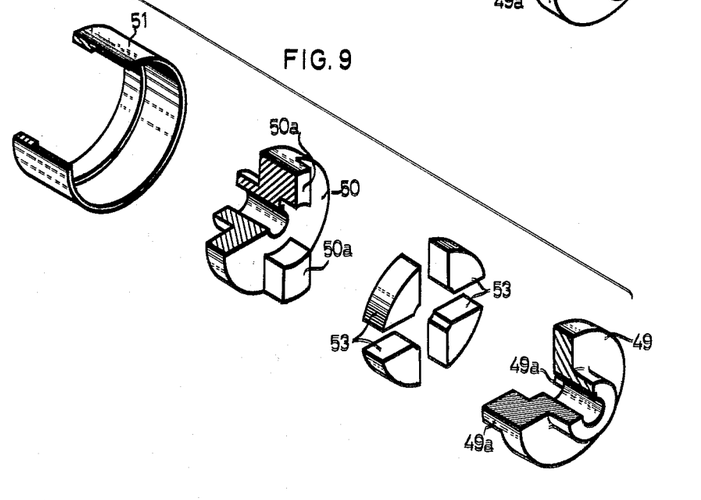
FIG. 9 is a partially cut-out perspective view showing respective members of the coupling of FIG. 4 in the fragmentary state.

The hob shaft 25 is rotatably supported on the side portion of the hob head 24 by a sliding main bearing 42 and a bearing 43, and a first gear of the gear transmission mechanism 35 for transmitting the power for turning the table 28 is attached to the almost central portion of the hob shaft 25. A hob arbor 44 is taper-fitted in the front end portion of the hob shaft 25, so that arbor 44 can be rotated integrally with the hob shaft 25. The hob 26 is fitted in the hob arbor 44 and rotatably supported by a top metal 45. FIGS. 5 and 6 illustrate an example of the hob 26 that is used for the carbide hobbing machine of the present embodiment. In this hob provided with carbide blades, a carbide tip 46 for every blade is soldered to a hob proper 47 composed of a quenched and hardened alloy tool steel in soldering portions 48a, 48b, 48c and 48d covering a relatively broad area as a whole. In order to increase the rigidity of the cutting blade, the width of the base portion of the blade is expanded.

As will be apparent from FIGS. 4, 7, 8 and 9, the hydraulic motor 32 is disposed adjacently to the rear end of the hob shaft 25, and the motor shaft 33 is located on the same axial line as that of the hob shaft 25. The coupling 34 is arranged between the confronting ends of the motor shaft 33 and the hob shaft 25, so that even when changes of the hobbing force are caused in the hob shaft 25, shocks caused by cutting-in or vibrations caused by hobbing can be absorbed and a large power can be transmitted smoothly.

The structure of the coupling 34 performing such function will now be described.

A driving coupling member 49 is fixed to the front end portion of the motor shaft 33 and a plurality of driving projections 49a projected in the axial direction are equidistantly formed on the front face of the driving coupling member 49. Separately, a driven coupling member 50 is fixed to the rear end portion of the hot shaft 25, and a plurality of driven projections 50a projected in the axial direction are equidistantly formed on the rear face of the driven coupling member 50, so that said driving projections 49a and driven projections 50a are arranged alternately. A coupling cover 51 is fitted and fixed to the periphery of the driven coupling member 50 at the front end thereof. A plurality of container chambers 52 are formed by this coupling cover 51 and said driving projections 49a and driven projections 50a.

A resilient member 53 having a substantially delta-shaped sectional profile is contained in each container chamber 52. An appropriate clearance 54 is formed between the peripheral face of each resilient member 53 and the coupling cover 51. In this embodiment, a urethane type polymeric material having a high internal friction, a high vibration damping effect and a low vibration frequency characteristic is used for the resilient member 53.

Figure 11A:
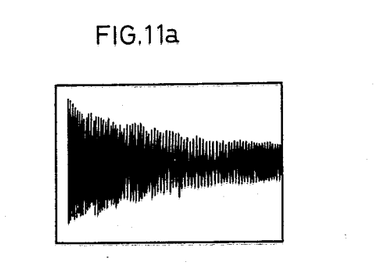
Figure 11B:
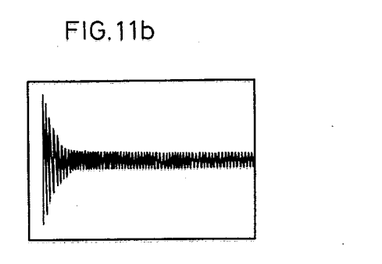

FIGS. 11-a and 11-b illustrate data of the effects of damping vibrations by driven coupling members 50 to which resilient members 53 differing in the constituting polymeric material are bonded, respectively. More specifically, FIG. 11-a shows results obtained by using a rubber sheet composed solely of cured butyl rubber as the resilient member 53 and FIG. 11-b shows results obtained by using a sheet composed of 52% of a urethane rubber, 35% of a curing agent and 13% of castor oil as the resilient member 53. From comparison of results shown in FIGS. 11-a and 11-b, it will readily be understood that a urethane type polymeric material has a much higher effect of damping vibrations. Further, when the above-mentioned clearance 54 is appropriately set, a difference is brought about between the volume of the resilient member 53 and the volume of the container chamber 52, whereby deformation of the resilient member 53 is appropriately controlled.

Figure 10:
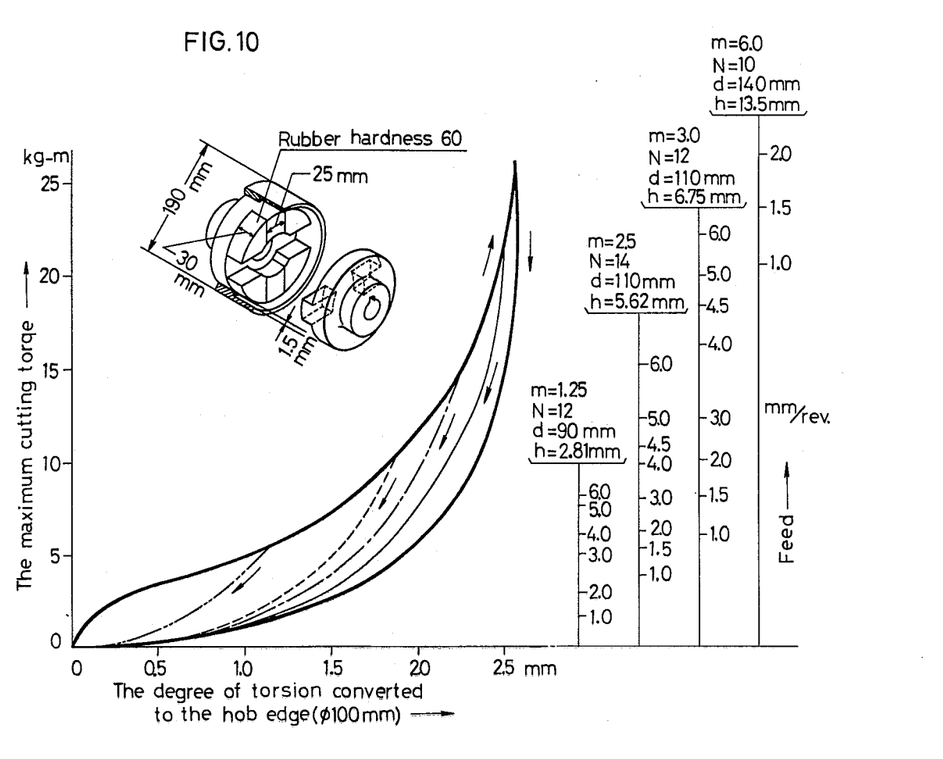
FIG. 10 is a view illustrating an example of design of the coupling and characteristics of the coupling.

FIG. 10 illustrates an example of design of the coupling 34 for use in carbide hobbing of modules 1 to 6. The cutting torque on the hob shaft 25 is increased in the state where this coupling is attached, and then, the torque is gradually decreased. The static torsion characteristic on the periphery of the hob 26 having a diameter of 100 mm under such change of the cutting torque and the relation between the grade of the feed at carbide hobbing of modules 1 to 6 and the cutting torque are illustrated in FIG. 10. From the static torsion characteristic shown in FIG. 10, it is seen that at the initial stage of increase of the torque, the coupling 34 is well deformed even if the torque is small and it allows torsion of the hob shaft 25, but with increase of the torque, the rigidity of the coupling 34 is enhanced to prevent torsion of the hob shaft 25 from being enhanced beyond a certain level, and that when the torque is decreased, a residual strain is caused because of the internal friction of the resilient member 53 and the torsion of the hob shaft 25 is gradually removed. Accordingly, if this coupling 34 is employed, when the blades of the hob 26 start the operation of hobbing the gear material 31, large shocks imposed on the blades are moderated, and during the hobbing operation in which compression and shearing of cut chips are repeated, vibrations caused on the blades can be damped. Therefore, steel-made gears can be hobbed at high speeds with a powerful single cutting without occurrence of chipping.

In the static torsion characteristic shown in FIG. 10, enhancement of the degree of torsion caused by increase of the cutting torque is maintained at a lower level as the clearance 54 in the coupling 34 is smaller, and the rising gradient of the characteristic curve becomes steep. The quantity of the residual strain generated when the cutting torque is decreased varies depending on properties of the resilient member 53 in the coupling 34. As the spacing distance between the characteristic curve obtained when the torque is increased and the characteristic curve obtained when the torque is decreased is larger, the coupling has a higher effect of absorbing shocks and vibrations. If the clearance 54 in the coupling 34 and the hardness of the resilient member 53 are appropriately set depending on the module of a gear to be hobbed and the intensity of the cutting torque, an ideal coupling can be obtained. Of course, the coupling 34 can be designed, as shown in FIG. 10, so that it can be applied to hobbing of a broad range of modules 1 to 6.

The function of the carbide hobbing machine having the above structure will now be described.

When the hydraulic motor is started, the hob shaft 25 is rotated by the motor shaft 33 through the coupling 34, and the hob 26 attached to the top end of the hob shaft 25 is directly driven. Simultaneously, the table 28 is turned by the hob shaft 25 through the gear transmission mechanism 35 and the like to effect hobbing of the gear material 31. At the start of this hobbing operation, blades of the hob 26 cut in the gear material 31 and a large cutting torque is imposed on the blades. However, since the resilient member 53 in the coupling 34 causes an elastic deformation allowing torsion of the hob shaft 25, occurrence of chipping by violent collision of the blades of the hob 26 against the gear material 31 is effectively prevented and shocks imposed on the blades of the hob 26 are moderated, whereby the hobbing operation can be advanced smoothly.

After shocks on the blades of the hob 26 have thus been moderated by deformation of the resilient member 53, the rigidity of the resilient member 53 is gradually increased to prevent the torsion of the hob shaft 25 from being enhanced beyond a certain level, and with changes of the cutting torque on the blades of the hob 26, a residual strain is generated in the resilient member 53 and it is slowly restored to the original state, whereby vibrations caused by rotation of the blades can be damped. Therefore, irregular torsion or power loss is not caused between the motor shaft 33 and the hob shaft 25, and a large power can be transmitted assuredly from the hydraulic motor 32 to the hob 26 and even gears having a higher module can be quietly hobbed at high speeds with a powerful single cutting by using the carbide hob without occurrence of chipping.

When the blades of the hob 26 are taken out of the gear material 31, the torque on the blades is abruptly reduced. At this point, in case of the conventional hobbing machine equipped with the driving system indicated by chain lines in FIG. 2, since the power of the motor is transmitted to the hob through a number of gears and transmission shafts, the torsion deformation between the motor shaft and the hob shaft is restored and the cut line of the hobbed gear tends to be curved. In the driving system of the present embodiment, since the hob shaft 25 is directly driven by the hydraulic motor 32, the torsion deformation from the motor shaft 25 to the hob shaft is remarkably reduced and curving of the cut line is effectively prevented.

Figure 12:
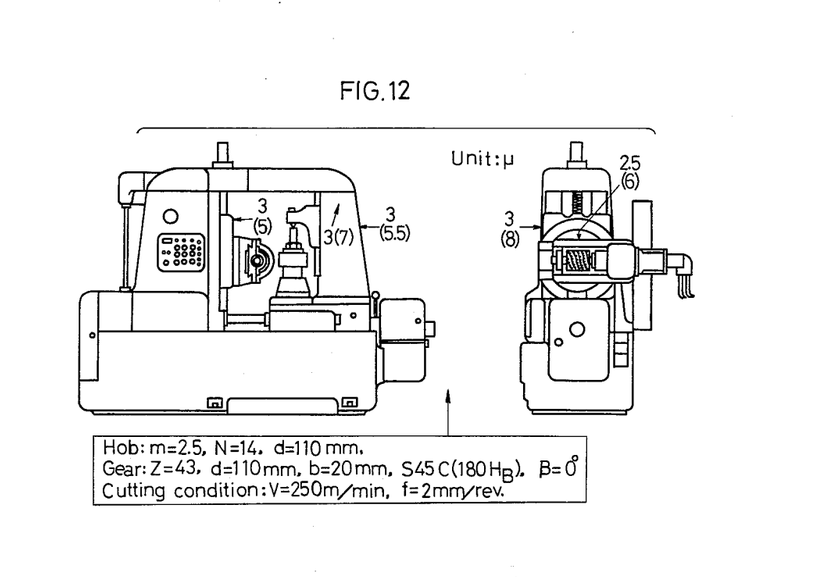
FIG. 12 is a view in which data of vibration amplitudes at respective parts of the carbide hobbing machine observed during the hobbing operation when a coupling for absorbing shocks and vibrations is provided and when such absorbing coupling is not provided are entered.

FIG. 12 shows data of vibration amplitudes at respective parts of the carbide hobbing machine, which are measured when gears are hobbed at a cutting speed of 250 m/min and a feed of 2 mm/rev by using a hob having a module of 2.5. Unparenthesized values are values measured with respect to the hobbing machine of this embodiment including the above-mentioned coupling 34 for absorbing shocks and vibrations, and parenthesized values are values measured with respect to the hobbing machine in which the coupling 34 is not disposed but the hob shaft 25 is directly connected to the motor shaft 33. From comparison of these values, it will readily be understood that vibrations at respective parts of the carbide hobbing machine can be halved by provision of the coupling 34 for absorbing shocks and vibrations.

Figure 13:
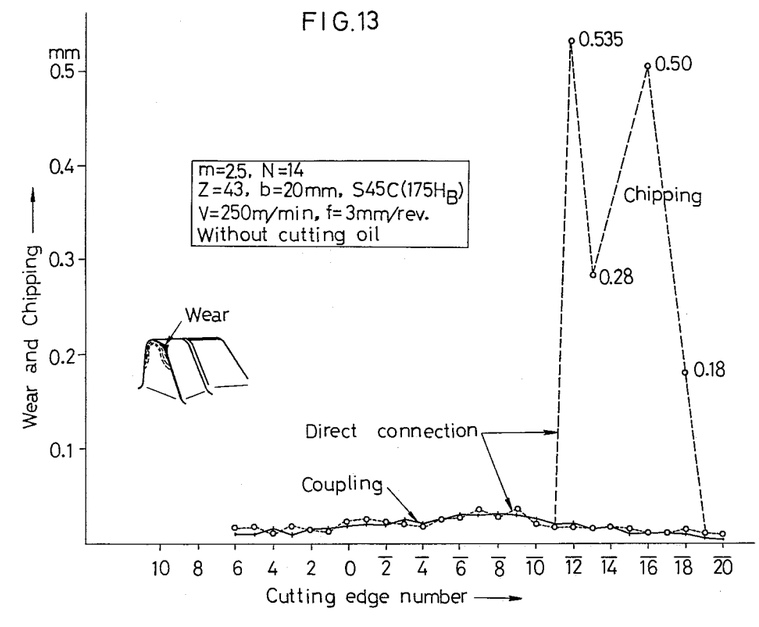
FIG. 13 is a view showing data of the wear and chipping of the cutting edge after hobbing of three gears by the carbide hobbing machine provided with the coupling for absorbing shocks and vibrations and the carbide hobbing machine not provided with such coupling.

FIG. 13 shows results of measurement of the wear and chipping of blades after three gears have been hobbed at the same part of the hob of a module of 2.5 equipped with carbide blades at a cutting speed of 250 mm/min and a feed of 3 mm/rev without using a cutting oil. A solid line indicates results obtained in case of the carbide hobbing machine of this embodiment provided with the coupling 34 for absorbing shocks and vibrations and a broken line indicates results obtained in case of the carbide hobbing machine in which the coupling 34 is not disposed but the hob shaft 25 is directly connected to the motor shaft 33. From the results shown in FIG. 13, it will readily be understood that when the coupling is not disposed, only after hobbing of 3 gears, large chippings are formed on blades of the carbide hob and hobbing of further gears is impossible. On the other hand, chippings are not caused at all in case of the carbide hobbing machine equipped with the coupling 34 for absorbing shocks and vibrations.

Figure 14:
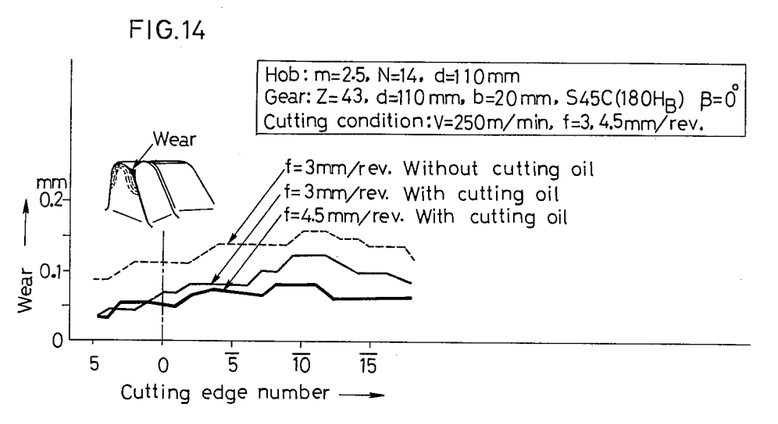
FIG. 14 is a view showing data of the maximum wear of the cutting edge observed when 40 gears have been hobbed under different cutting conditions.

FIG. 14 illustrates results of measurement of the maximum werar on blades which is caused when 40 gears are hobbed at a cutting speed of 250 m/min and a feed of 3 or 4.5 mm/rev in the presence or absence of a cutting oil at the same part of the hob of a module of 2.5 equipped with carbide blades in the carbide hobbing machine provided with the coupling 34 for absorbing shocks and vibrations. From the results shown in FIG. 14, it will be apparent that in each of the case where the feed is 3 mm/rev and a cutting oil is not used, the case where the feed is 3 mm/rev and a cutting oil is used and the case where the feed is 4.5 mm/rev and a cutting oil is used, chipping is not caused at all and that the maximum wear is reduced by the use of a cutting oil and the increase of the feed.

Figure 15A:
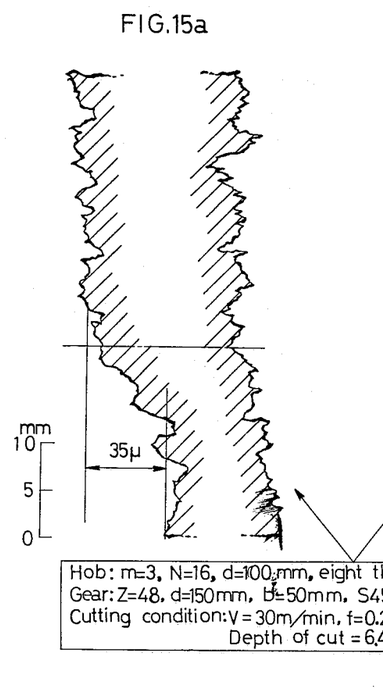
Figure 15B:
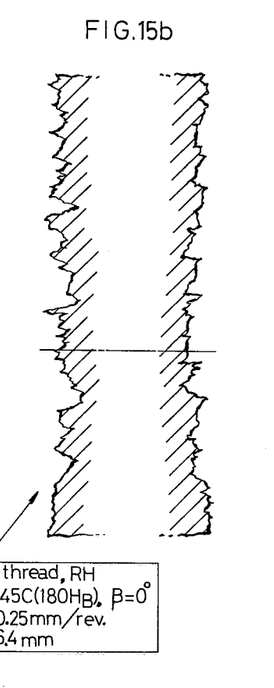

FIG. 15-a illustrates the cut line of a gear hobbed at a cutting speed of 30 m/min and a feed of 0.25 mm/rev by a carbide blade hob of a module of 3 by using the hobbing machine comprising the conventional driving system shown by chain lines in FIG. 2. FIG. 15-b illustrates the cut line of a gear hobbed under the same conditions as described above by using the carbide hobbing machine comprising the driving system of the present invention in which the hob shaft 25 is directly connected to the motor shaft 33 through the coupling 34 for absorbing shocks and vibrations. In case of the gear hobbed by the hobbing machine including the conventional driving system, it is seen that conspicuous curve is caused by restoration of the torsion deformation of the driving system, but in the gear hobbed by the carbide hobbing machine of the present invention, it is seen that no curve appears on the cut line.

As will be apparent from the foregoing illustration, according to the present invention, by virtue of the feature that a gear transmission mechanism is not disposed between a driving motor and a hob shaft but the hob shaft is directly connected to and driven by the driving moter through means for absorbing shocks and vibrations, steel-made gears can be hobbed at high speeds with a powerful single cutting without occurrence of chipping, whereby the efficiency of manufacture of gears can be remarkably increased and gears having a high precision can be manufactured assuredly.

The present invention has been described in detail hereinbefore by reference to the most preferred embodiments, but as will be apparent to those skilled in the art, a variety of embodiments and modifications can be made within the scope and spirit of the present invention. It also will be apparent that the present invention is not limited to specific embodiments except those set forth in the appended claims.

The technical concept of the present invention can be applied to not only carbide hobbing machines but also other various working machines such as milling machines, rack cutting machines and horizontal boring machines, and good results can be expected in each case.

What I claim is:

1. A carbide hobbing machine comprising:
   (a) a tool support member (24) operably mounted on a machine frame and including a hob support shaft (25) for supporting a carbide hob (26);
   (b) a work piece support member (28) operably mounted on the machine frame to support a work piece (31);
   (c) a hydraulic motor (32) mounted on the tool support member adjacent to the carbide hob and including a motor shaft (33) extending on the same axial line as that of the hob support shaft;
   (d) a coupling (34) disposed between the motor shaft (33) and the hob support shaft (25) to directly drive the carbide hob (26) and to absorb shocks and vibrations imposed on the carbide hob during the operation of hobbing the work piece, said coupling including:
   (e) a drive coupling disk (49) fixed to the motor shaft and having a plurality of drive projections (49a) on its side face;
   (f) a driven coupling disk (50) fixed to the hob support shaft and having a plurality of driven projections (50a) on its side face so that the drive projections and driven projections are arranged alternately;
   (g) a cylindrical coupling cover (51) disposed on the outside of the two coupling disks to form a plurality of substantially delta-shaped container chambers (52) in cooperation with the drive and driven projections;
   (h) a delta-shaped resilient member contained in each of the container chambers in contact with the drive and driven projections at both side faces; and,
   (i) a clearance (54) defined in said coupling (34) between the peripheral face of each resilient member (53) and the coupling cover (51) sized to permit the resilient members to be elastically deformed outwardly so as to allow torsion of the hob support shaft when a cutting edge of the hob bites at the work piece and for preventing the deformation of resilient members beyond a certain level so as to impede the torsion of the hob support shaft with advance of the hobbing operation, whereby the resilient member is slowly restored to the original state while leaving a residual strain sufficient to gradually eliminate the torsion on the hob support shaft at the time of completion of the hobbing operation by the cutting edge of the hob.

2. A carbide hobbing machine as claimed in claim 1 wherein each of said resilient members is composed of a polymeric material represented by a urethane rubber.

3. A carbide hobbing machine as claimed in claim 1 wherein the coupling cover is fixed to said drive or driven coupling disk.

* * * * *